(12) United States Patent
Firestone

(10) Patent No.: US 10,715,585 B2
(45) Date of Patent: Jul. 14, 2020

(54) PACKET PROCESSOR IN VIRTUAL FILTERING PLATFORM

(71) Applicant: Microsoft Technology Licensing, LLC, Redmond, WA (US)

(72) Inventor: Daniel Firestone, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/639,331

(22) Filed: Jun. 30, 2017

(65) Prior Publication Data

US 2018/0262599 A1    Sep. 13, 2018

Related U.S. Application Data

(60) Provisional application No. 62/469,696, filed on Mar. 10, 2017.

(51) Int. Cl.
*G06F 9/455* (2018.01)
*H04L 12/713* (2013.01)
(Continued)

(52) U.S. Cl.
CPC .......... *H04L 67/10* (2013.01); *G06F 9/45558* (2013.01); *H04L 45/42* (2013.01);
(Continued)

(58) Field of Classification Search
CPC ...... G06F 9/45558; G06F 2009/45562–45595; H04L 12/4633–4695; H04L 12/66;
(Continued)

(56) References Cited

U.S. PATENT DOCUMENTS 8,930,690 B2    1/2015 Zuo et al.
9,509,809 B2    11/2016 Laufer et al.
(Continued)

FOREIGN PATENT DOCUMENTS

WO    2017018989 A1    2/2017

OTHER PUBLICATIONS

International Search Report and Written Opinion Issued in PCT Application No. PCT/US2018/020991, dated Jun. 14, 2018, 13 Pages.*

(Continued)

*Primary Examiner* — Timothy J Weidner
(74) *Attorney, Agent, or Firm* — Liang IP, PLLC

(57) ABSTRACT

Computing systems, devices, and associated methods of operation of processing packets in a distributed computing system are disclosed herein. In one embodiment, a method includes receiving a packet having a header with multiple header fields and a payload and parsing one or more of the multiple header fields of the received packet. The method also includes matching the received packet with an rule object from each of multiple layer objects individually containing multiple rule objects based on the parsed one or more of the multiple header fields. The rule object has one or more conditions matching the one or more parsed header fields of the packet and a corresponding flow action. The method further includes generating a composite action by combining the flow actions individually corresponding to one of the matched rule objects from one of multiple layer objects and applying the generated composite action to the packet.

20 Claims, 10 Drawing Sheets

(51) Int. Cl.
*H04L 12/717* (2013.01)
*H04L 12/741* (2013.01)
*H04L 12/747* (2013.01)
*H04L 12/851* (2013.01)
*H04L 12/931* (2013.01)
*H04L 29/06* (2006.01)
*H04L 29/08* (2006.01)
*H04L 29/12* (2006.01)

(52) U.S. Cl.
CPC ............ *H04L 45/54* (2013.01); *H04L 45/586* (2013.01); *H04L 45/742* (2013.01); *H04L 45/745* (2013.01); *H04L 47/2441* (2013.01); *H04L 47/2483* (2013.01); *H04L 49/70* (2013.01); *H04L 69/22* (2013.01); *G06F 2009/45595* (2013.01); *H04L 61/2503* (2013.01); *H04L 69/325* (2013.01); *H04L 69/326* (2013.01)

(58) Field of Classification Search
CPC ......... H04L 29/0653; H04L 29/06578–06625; H04L 29/06823–0685; H04L 43/02–028; H04L 45/54; H04L 45/58–586; H04L 45/742–748; H04L 47/2441; H04L 47/2483; H04L 47/80–808; H04L 49/354–358; H04L 49/70; H04L 63/0227–029; H04L 63/10–105; H04L 67/10; H04L 69/22; H04L 69/325; H04L 69/326
See application file for complete search history.

(56) References Cited

U.S. PATENT DOCUMENTS

| | | |
|---|---|---|
| 2013/0067067 A1 | 3/2013 | Miri et al. |
| 2014/0334489 A1 | 11/2014 | Bosshart et al. |
| 2015/0078384 A1* | 3/2015 | Jackson ................ H04L 45/748 370/392 |
| 2015/0244842 A1* | 8/2015 | Laufer .................... H04L 69/22 370/392 |
| 2017/0026283 A1 | 1/2017 | Williams et al. |
| 2017/0048200 A1 | 2/2017 | Chastain |
| 2017/0085479 A1* | 3/2017 | Wang .................... H04L 45/745 370/392 |
| 2018/0262556 A1 | 9/2018 | Firestone |

OTHER PUBLICATIONS

Lajos, Zoltan Kis., et al., "OpenFlow Switch Specification", Version 1.2 ( Wire Protocol 0x03 ), Dec. 5, 2011, 83 Pages.

"International Search Report and Written Opinion Issued in PCT Application No. PCT/US18/020990", dated Jun. 14, 2018, 17 Pages.

"Non Final Office Action Issued in U.S. Appl. No. 15/639,319", dated Feb. 27, 2019, 12 Pages.

"Final Office Action Issued in U.S. Appl. No. 15/639,319", dated Jun. 13, 2019, 12 Pages.

"Notice of Allowance Issued in U.S. Appl. No. 15/639,319", dated Sep. 11, 2019, 9 Pages.

Jose, et al., "Mapping Match Action Tables to Switches", Retrieved From https://www.usenix.org/sites/default/files/ons2014-poster-jose.pdf, Jul. 2014, 2 Pages.

* cited by examiner

| Conditions | Actions |
|---|---|
| Source/Dest MAC | Allow/Block (Stateful/Stateless) |
| Source/Dest IP | NAT (L3/L4), (Stateful/Stateless) |
| Source/Dest TCP Port | |
| Source/Dest UDP Port | Encap/Decap |
| GRE Key | QoS – Rate Limit, Mark DSCP, Meter |
| VXLAN VNI | |
| VLAN ID | Encrypt/Decrypt |
| Metadata From Previous Layer | Stateful Tunneling |
| | Routing (ECMP) |

*FIG. 5*

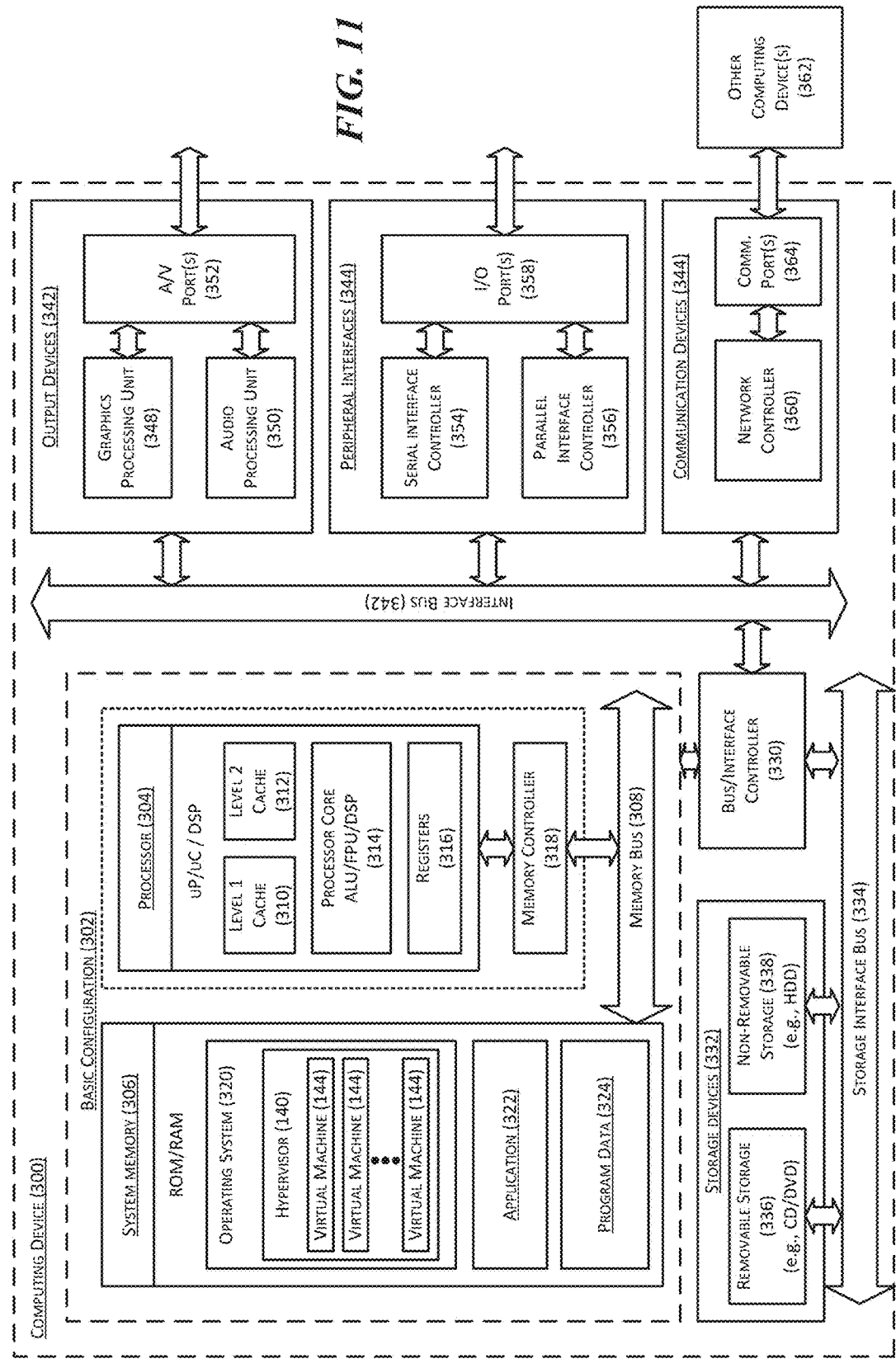

PACKET PROCESSOR IN VIRTUAL FILTERING PLATFORM

CROSS-REFERENCE TO RELATED APPLICATION(S)

This application is a non-provisional application of and claims priority to U.S. Provisional Application No. 62/469,696, filed on Mar. 10, 2017, the disclosure of which is incorporated herein in its entirety.

BACKGROUND

Distributed computing systems typically include routers, switches, bridges, and other physical network devices that interconnect a large number of servers, network storage devices, and other types of computing devices. The individual servers can host one or more virtual machines ("VMs") or other types of virtualized components. The virtual machines can facilitate execution of suitable applications to provide desired cloud services or other suitable computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The rise of public cloud services, such as Amazon Web Services®, Microsoft Azure®, and Google Cloud Platform® has created large scales of datacenter computing. Data centers providing public cloud services regularly involve server counts in the millions. Cloud service providers not only need to provide scale, high density, and high performance of VMs to customers, but also rich network semantics, such as private virtual networks with customer supplied address spaces, scalable load balancers, security groups and Access Control Lists ("ACLs"), virtual routing tables, bandwidth metering, Quality of Service ("QoS"), etc.

Traditional core routers and hardware may not be economically implemented at scale to provide levels of network performance needed for large scale data centers. Instead, one approach is to implement network policies in software on VM hosts and in virtual switches that connect VMs to a computer network. As this implementation separates a centralized control plane from a data plane on a host, such a technique can be considered an example of Software Defined Networking ("SDN"), and in particular, host-based SDN. Implementations of host-based SDN, however, often assume a single network controller that has overall responsibility in programming the virtual switches. However, the inventor has recognized that independent teams often develop and build new network controllers or agents for different applications to provide corresponding cloud computing services. Thus, having a single network controller with overall responsibility in programming the virtual switches can create complex dependencies, negatively impact scalability, and significantly reduce serviceability of the virtual switches.

Several embodiments of the disclosed technology are directed to a programmable virtual filtering platform for virtual switches. The virtual filtering platform implements a programming model that not only allows distinct network controllers (e.g., SDN controllers) to independently create and define own policies and actions, but also enforce layering and boundaries between the defined policies and actions. For example, rules with arbitrary GOTOs to other tables may be disallowed. As such, new network controllers can develop to add functionality to virtual switches without impacting policies created by existing network controllers, and vice versa.

In certain embodiments, the programming model can include policies and actions in the form of Match Action Tables ("MATs") that are organized as multiple network filter objects in a hierarchy. Network controllers can independently create, program, and/or update the network filter objects according to target SDN policies and actions. Example of such network filter objects can include port, layer, group, and/or rule objects in a top-to-bottom hierarchical order. The virtual switch can utilize each of the foregoing network filter objects when processing incoming and outgoing packets, as described in more detail below. In other examples, the network filter objects can be organized as a single sequence, multiple sequences, or in other suitable manners.

In certain implementations, port objects can be basic units of network filtering policies. Each port object can correspond to a virtual port in a virtual switch, as specified by, for instance, an IP address and a TCP port number in a virtual network. Each port object can include multiple MATs based on which the virtual switch can act as one or more network filters on inbound or outbound path of a corresponding virtual port. Typically, network controllers can program network policies on behalf of a virtual machine or virtual network interface card ("VNIC"). As such, separation of the port objects can allow the network controllers to independently manage SDN policies on various virtual machines. In other implementations, port objects can be replaced by virtual network objects, tenant site objects, or other suitable types of objects.

Policies included in a port object can be further divided into multiple layer objects arranged in a sequential manner. Layer objects can each include one or more MATs that network controllers can use to specify network filtering policies. Different network controllers can separately create, update, or otherwise manage each of the layer objects, or one network controller can create several layer objects. Each layer object can contain a MAT with inbound and outbound rules (as contained in rule objects) reflecting corresponding policies that can filter and modify incoming and outgoing packets. Logically, packets go through each layer objects one by one to match rules in each based on a state of the individual packets after one or more actions performed in a previous layer object. Network controllers can specify a sequence of the multiple layer objects for a virtual port or port object with respect to one another, and create, modify, and/or remove layer objects dynamically during operation.

Rule objects can include entries of a MAT. Each entry (or "rules") can define conditions and corresponding actions on matching packets. Rule objects can allow a network controller to be expressive while minimizing fixed policy in a data plane. In certain embodiments, rules can include a condition list coupled with an action. The condition list can include one or more conditions individually include a rule type (e.g., source IP address) and a list of one or more matching values (e.g., an IP address, a range of IP addresses, a prefix of IP addresses, etc.). The matching values can thus be a singleton, range, or prefix. For a condition to match a packet, any of the matching values can match, as in an OR clause. For a rule object to match, all conditions in the rule much match, as in an AND clause. The action can contain an action type (e.g., packet encapsulation) and a data structure specific to that action type with corresponding data to perform the action (e.g., encapsulation header values). For example, an encapsulation rule can include an action of packet encapsulation that uses input data of source/destination IP addresses, source/destination media access control ("MAC") addresses, an encapsulation format, and/or key in encapsulating a packet that matches the list of conditions of the rule object.

In some implementations, rule objects in a layer object can be logically organized into one or more groups represented by group objects for management purposes such as transactional updates. For example, rule objects related to virtual network operations, network name translations, or access control list operations can be grouped into separate group objects that correspond to MATs. When classifying packets, all group objects in a layer object can be iterated to locate, for instance, a single rule (e.g., a highest priority rule) in each group that matches the packet. In certain embodiments, a rule object matched by a last group can be selected. In other embodiments, a rule object can also be marked "terminating" to indicate that if a packet matches the rule object, the action of the rule object would be applied immediately without traversing additional groups. Group objects can also have conditions similar to rule objects. For instance, if a packet does not match a condition associated with a group object, the group object and associated rule objects contained therein can be skipped when iterating through all the group objects. In other embodiments, the group objects may be omitted, and a layer object can include multiple rules of different types.

In operation, when a packet is received at the virtual switch, the virtual switch can iterate through all the rules in all group objects in each layer to match the packet. The virtual switch can then perform the action associated with the matching rule on the packet before iterating all the rules in all groups objects in the next layer object. In one example, the virtual switch can iterate through layer objects containing policies related to virtual network operations (e.g., converting between a virtual network address and a physical network address), network address translations (e.g., translation between a virtual IP address and a direct IP address), access control list operations (e.g., determining whether access rights are allowed, denied, or audited), and metering operations (e.g., packet buffering and QoS control) in sequence. In other examples, the virtual switch can filter the received packets based on priority or other suitable criteria.

By enforcing layering of the layer objects with associated group and/or rule objects, the virtual switch can process all the network filtering policies developed and created by independent network controllers. For example, a first network controller can develop and create a first layer object related to operations of virtual network operations while a second network controller can develop and create a second layer object related to network address translations. By separating such filtering policies into independent layer objects, policies related to each layer object can be managed independently without affecting operations of the other layer object. For instance, the first network controller can update the first layer object with new policies related to operations of virtual network operations without affecting operations of the second layer object because filtering of any incoming and outgoing packets is performed in an accumulative fashion. As such, several embodiments of the disclosed technology can have great flexibility in allowing independent development of network filtering policies without affecting enforcement of other policies by the virtual switch.

Processing a packet according to layers in sequence can involve parsing the packet, modifying the packet according to a selected rule, and forwarding the modified packet to the next layer for a repeat of similar operations. Such repeated parsing and modification can reduce packet processing performance as packets traverse each layer in turn. Thus, as a number of layers, groups, and rules increase, packet processing at NICs or virtual switches can become a bottleneck for virtual machine performance, especially when individual hosts continue to host increasing numbers of virtual machines.

Several embodiments of the disclosed technology can provide high packet processing rates via flow action caching even for large numbers of layers, groups, or rules. A flow generally refers to a stream of packets received/transmitted via a single network connection as identified by, for example, an IP address and a TCP port number. In certain implementations, flow actions across layers or MATs can be compiled based on metadata (e.g., values of certain header fields) of a packet to derive a composite action for a flow (e.g., as identified by an IP address and a TCP port number) without applying actions from the individual layers in sequence. For example, the composite action may include a network name translation and an encapsulation/decapsulation, which are applied to the payload of the packet only after the composite action is derived. The composite action can also be cached as corresponding to a flow identified by a unified flow identifier (e.g., a hash value of the IP address and TCP port number). As such, subsequent packets of the same flow can be matched with the precompiled composite action without having to traverse the layers again. Thus, fast packet processing can be provided for large numbers of rules and MATs.

Several embodiments of the disclosed technology are also directed to implementing an efficient mechanism to offload rules or flow policies to programmable network interface cards ("NICs") to support single root input/output virtualization without assuming complex rule processing. Programmable NICs can thus process and forward packets directly to virtual machines while applying relevant policies. However, as network controllers create more MATs and rules, directly offloading large flow tables may require prohibitively expensive hardware resources (e.g. large ternary content addressable memories and matching in series). Thus, instead of offloading flow tables, the disclosed technology can precompile flow actions across layers or MATs and provide the precompiled flow actions to programmable NICs to match and apply corresponding composite actions.

BRIEF DESCRIPTION OF THE DRAWINGS

FIG. 5 is a schematic diagram illustrating example conditions and corresponding actions for a rule object suitable for a virtual switch in accordance with embodiments of the disclosed technology.

FIG. 11 is a computing device suitable for certain components of the distributed computing system in FIG. 1.

DETAILED DESCRIPTION

Figure 1:
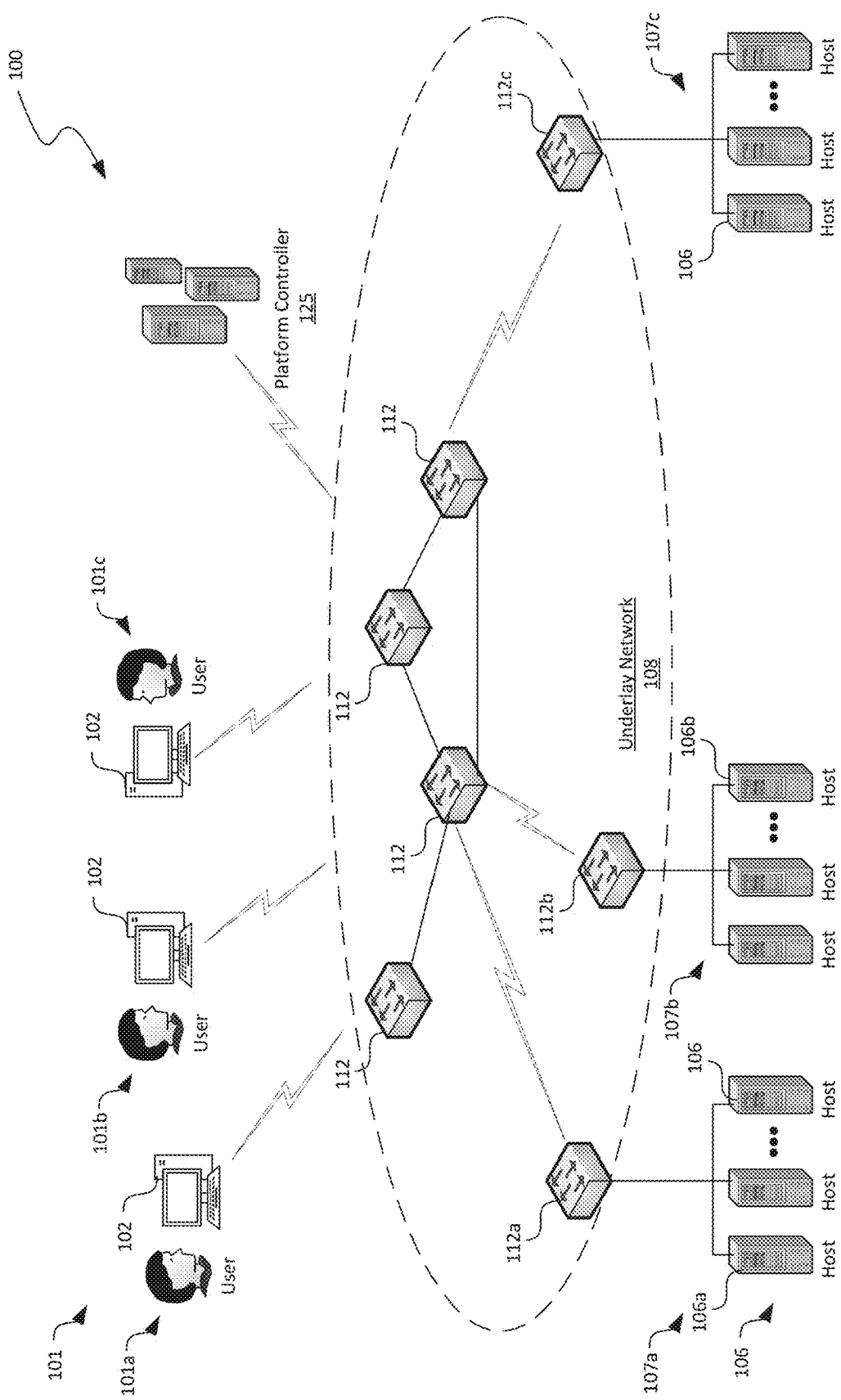
FIG. 1 is a schematic diagram illustrating a distributed computing system implementing a virtual filtering platform in accordance with embodiments of the disclosed technology.

Certain embodiments of systems, devices, components, modules, routines, data structures, and processes for filtering packets at virtual switches implemented at hosts in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-11.

As used herein, the term "distributed computing system" generally refers to an interconnected computer network having a plurality of network nodes that connect a plurality of servers or hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines, virtual switches, or other suitable virtualized components. For example, a host can include a server having a hypervisor configured to support one or more virtual machines, virtual switches or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Also used herein, a "virtual switch" generally refers to a logical switching fabric provided by executing a software program on a computing device for facilitating network communications to and from virtual machines hosted on the computing device. A virtual switch can intelligently direct communications on a computer network by inspecting packets before passing the packets to suitable destinations. In certain implementations, software programs of virtual switches can be embedded or otherwise included in a virtualization component such as Hyper-V native hypervisor provided by Microsoft Corporation of Redmond, Wash. In other implementations, virtual switches can also be included as a firmware component in hardware of a computing device.

Further used herein, a Match Action Table ("MAT") generally refers to a data structure having multiple entries in a table format. Each of the entries can include one or more conditions and a corresponding action. The conditions can be configured by a network controller (e.g., an SDN controller) for matching a set of header fields of a packet. The action can also be configured by the network controller to apply an operation to the packet when the conditions match the set of header fields of the packet. Example conditions and actions are shown in FIG. 5.

Further used herein, a "flow" generally refers to a stream of packets received/transmitted via a single network connection between two end points (e.g., servers, virtual machines, or applications executed in the virtual machines) as identified by, for example, an IP address and a TCP port number. A "flow action" generally refers to one or more actions that modify at least a portion of a packet of the flow in order to forward the packet to an intended destination. Example flow actions are described below with reference to Table 3 below.

Many modern scalable cloud networking architectures rely on host networking for implementing VM network policies. Examples of such policies can include tunneling for virtual networks, network address translation ("NAT") for load balancing, stateful access control lists ("ACLs"), quality of service ("QoS"), and other suitable types of procedures. Several embodiments of the disclosed technology are directed to a programmable virtual switch platform that can provide such policies to power a public cloud or other suitable distributed computing systems. Embodiments of the platform can support multiple independent network controllers to develop and create policies, policies based on connections rather than packets, efficient caching and classification for performance, and efficient offload of flow policies to programmable network interface cards ("NICs"). Embodiments of the platform can be deployed on hosts running Infrastructure as a service ("IaaS"), Platform as a service ("PaaS"), or other suitable types of workloads.

Throughout the description below, two examples are used to illustrate how the programmable virtual switch platform supports policies and actions. The first example is a VL2 network useable to create virtual networks ("VNETs") on shared hardware using stateless tunneling between hosts. The second example is a scalable Layer-4 load balancer, which scales by running the load balancing NAT in the virtual switch on end-point hosts, leaving the in-network load balancers stateless and scalable. Even though the descriptions below are related to a design of virtual switches and related Application Programming Interface ("API") as applied to a distributed computing system, in other embodiments, the disclosed techniques can also have other suitable designs that are applied to other suitable types of computing systems, such as those without support for virtual machines.

FIG. 1 is a schematic diagram illustrating a distributed computing system 100 implementing a virtual filtering platform in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown).

As shown in FIG. 1, the underlay network 108 can include one or more network nodes 112 that interconnect the multiple hosts 106 and the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology. The underlay network can allow communication between hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the initiated virtual machines 144 to perform computation, communication, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The platform controller 125 can be configured to manage operations of various components of the distributed computing system 100. For example, the platform controller 125 can be configured to allocate virtual machines 144 (or other suitable resources) in the distributed computing system 100, monitor operations of the allocated virtual machines 144, or terminate any allocated virtual machines 144 once operations are complete. In the illustrated implementation, the platform controller 125 is shown as an independent hardware/software component of the distributed computing system 100. In other embodiments, the platform controller 125 can also be a datacenter controller, a fabric controller, or other suitable types of controller or a component thereof implemented as a computing service on one or more of the hosts 106.

Figure 2:
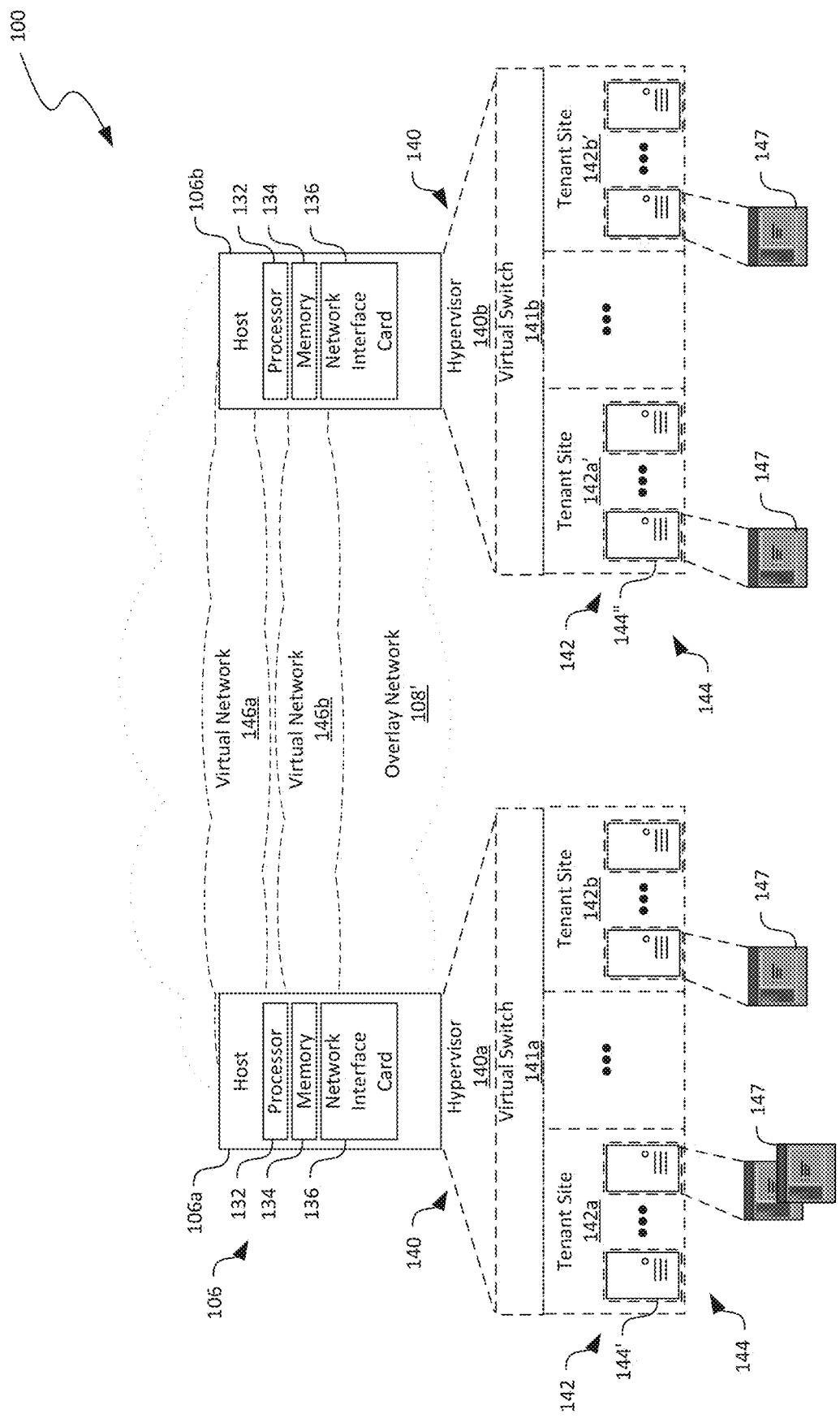
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and network interface card 136 operatively coupled to one another. The processor 132 can include a microprocessor, a field-programmable gate array, and/or other suitable logic devices. The memory 134 can include volatile and/or non-volatile media (e.g., ROM; RAM; magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4A and 4B). The network interface card 136 can include a network adapter, a LAN adapter, physical network interface, or other suitable types of hardware component that connects a host 106 to the underlay network 108 (FIG. 1). In other embodiments, the hosts 106 can also include input/output devices configured to accept input from and provide output to an operator and/or an automated software controller (not shown), or other suitable types of hardware components.

The first and second hosts 106a and 106b can individually contain instructions in the memory 134 executable by the processors 132 to cause the individual processors 132 to provide a hypervisor 140 (identified individually as first and second hypervisors 140a and 140b) and a virtual switch 141 (identified individually as first and second virtual switches 141a and 141b). Even though the hypervisor 140 and the virtual switch 141 are shown as separate components, in other embodiments, the virtual switch 141 can be a part of the hypervisor 140 (e.g., operating on top of an extensible switch of the hypervisors 140), an operating system (not shown) executing on the hosts 106, or a firmware component of the hosts 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). The virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

To facilitate communications among the virtual machines 144, the virtual switches 141 can be configured to switch or filter packets (not shown) directed to different virtual machines 144. As described in more detail below with reference to FIGS. 3-9A, the virtual switches 141 can be implemented with a virtual filtering platform in which various network filter objects can be organized in a hierarchy of port, layer, group, and rule objects in accordance with embodiments of the disclosed technology. By enforcing layering of the various network filter objects, different network controllers 116 (e.g., SDN controllers, shown in FIG. 3) can independently program and configure the various network filter objects with various policies without affecting enforcement of other policies by the virtual switches 141.

Figure 3:
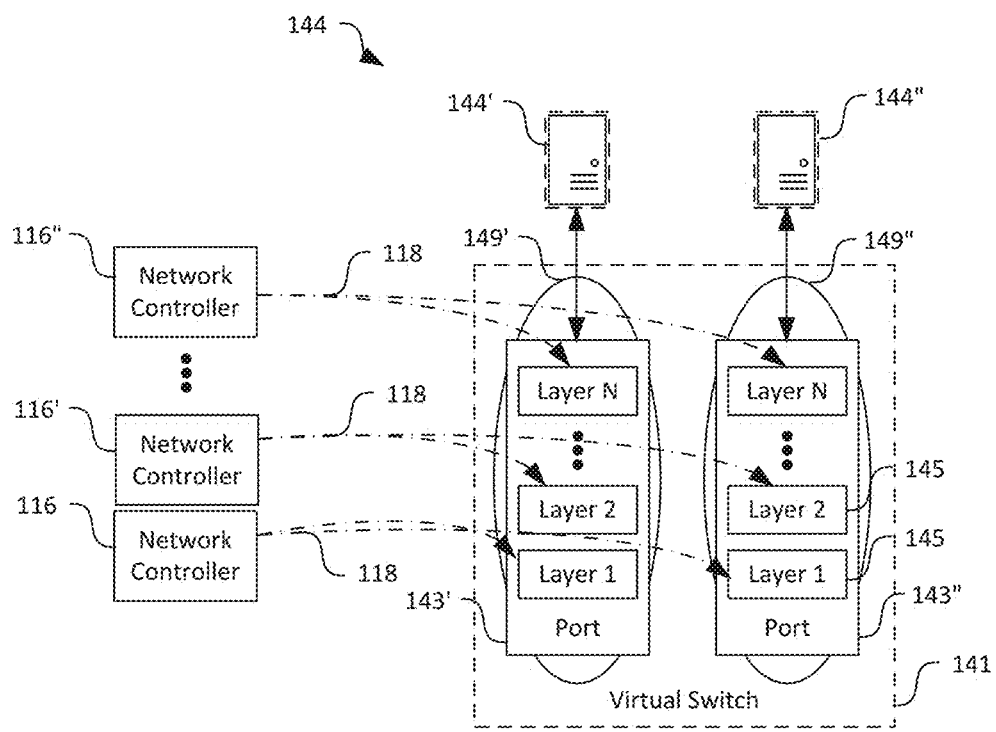
FIG. 3 is a schematic diagram illustrating a virtual switch implemented at a host in a distributed computing system in accordance with embodiments of the disclosed technology.

FIG. 3 is a schematic diagram illustrating a virtual switch 141 implemented at a host 106 in the distributed computing system of FIGS. 1 and 2 in accordance with embodiments of the disclosed technology. As shown in FIG. 3, the virtual switch 141 can include one or more virtual ports 149 (identified individually as first and second virtual ports 149' and 149"). The virtual ports 149 can each include a data object that represents an internal port on the network interface card 136 (FIG. 2) that supports single root I/O virtualization. Each virtual port 149 can correspond to one of the virtual machines 144. For example, as shown in FIG. 3, the first virtual port 149' corresponds to the first virtual machine 144', and the second virtual port 149" corresponds to the second virtual machine 144". The virtual ports 149 can, for instance, be connected to virtual NICs (VNICs). In other embodiments, a single virtual port 149 may correspond to multiple virtual machines 144 by implementing, for example, virtual queues (not shown) or other suitable data channels.

For each of the virtual ports 149, the virtual switch 141 can be configured to filter incoming or outgoing packets from a VNIC to the virtual switch 141 and from the virtual switch 141 to a VNIC based on one or more network filter objects. From the perspective of a virtual machine 144 with a VNIC attached to a virtual port 149, ingress traffic to the virtual switch 141 is considered "outbound" traffic from the virtual machine 144, and egress traffic from the virtual switch 141 is considered "inbound" traffic to the virtual machine 144.

As used herein, a "network filter object" generally refers to a software object or a set of software objects individually containing one or more conditions, actions, or other suitable information that instructs the virtual switch 141 on performance of the one or more actions when a packet meets the one or more conditions. In one example, certain header fields of a packet can be extracted and compared to one or more conditions. If the header fields of the packet contain values that match the conditions, the virtual switch 141 can perform corresponding actions on the packet. On the other hand, if the header fields of the packet do not contain values that match the conditions, the virtual switch 141 can skip performing the corresponding actions on the packet. Thus, each network filter object can include one or more MATs based on which the virtual switch 141 can act as one or more virtual network filters on inbound or outbound path of a corresponding virtual port 149.

In the illustrated embodiment in FIG. 3, each virtual port 149 can correspond to a port object 143, which in turn includes multiple layer objects 145 (shown as "Layer 1," "Layer 2," . . . , "Layer N"). As discussed in more detail below with reference to FIG. 4, each layer object (or "layer") 145 can further include multiple group objects (or "groups") 146, which in turn can include multiple rule objects (or "rules") 148. Thus, an example hierarchy of the various network filter objects can include:

Ports, as a basic unit that policy filters on;
Layers, stateful flow tables that hold MAT policies;
Groups, entities to manage and control related sets of rules within a layer; and
Rules, match action table entries with one or more conditions and actions.

In certain implementations, the foregoing network filter objects can be programmed with a priority value, in which order the network filter objects can be processed by rule matching. In other implementations, the network filter objects can have the same priority level and be processed sequentially, randomly, or in other suitable manners.

Layers 145 can include basic MATs that the network controllers 116 use to specify desired policies. Layers 145 can be created and managed separately by different network controllers 116, or one network controllers 116 can create several layers 145. Each layer 145 can contain inbound and outbound rules 148 reflecting corresponding policies that can filter and modify packets. Logically, packets go through each layer 145 one by one, matching rules 148 in each based on a state of the packets after the action performed in the previous layer 145. The network controllers 116 can specify the ordering of layers 145 with respect to other layers 145, and create and remove layers 145 dynamically during operation. In other embodiments, multiple virtual ports 149 may correspond to a single port object 143. In further embodiments, the multiple network filter objects may have other suitable data structures and/or organizations.

By utilizing a programming model based on a hierarchy of the foregoing network filter objects, separate network controllers 161 (illustrated as first, second, and third network controllers 116, 116', and 116", respectively) can create and program to specify desired SDN policies, as indicated by the arrows 118. For example, the first network controller 116 can be configured to create and manage policies for a virtual machine 144 in a virtual network to encapsulate and decapsulate traffic into tunnels. The second network controller 116' can be configured to create and manage policies for network name translation. The third network controller 116" can be configured to create and manage policies for access control lists, metering, or other suitable network operations.

In operation, the virtual switch 141 can filter incoming or outgoing packets based on the various network filter objects, and thereby perform virtual network operations, network name translation, or other suitable operations on the packets.

Packets can traverse layers 145 in the opposite direction during inbound than during outbound traffic. When processing packets 114, the virtual switch 141 can search for a single rule 148 in each layer 145 to match by searching the groups 146 of rules 148 inside a layer 145 for a matching rule 148. The action of the matched rule 148 is then performed on the packet 114. In certain embodiments, only one rule 148 can match a packet 114 in a layer 145 with other matching rules 148 of lower priority ignored. In other embodiments, more than one rule 148 can match a packet 114 in a layer 145 with corresponding actions performed in an accumulative or other suitable manners.

The foregoing traversing technique gives packets a "layering" effect when the network controllers 116 implement opposite policies on either side of a layer 145. For example, a NAT network controller 116 can create a NAT layer 145 implementing a network address translation. On an inbound direction, the NAT layer 145 can perform network name translation on packets destined to a Virtual IP ("VIP") from VIP to a Direct IP ("DIP"). On the outbound direction, the NAT layer 145 can perform network name translation on packets from DIP to VIP. The NAT layer 145 thus implements an address space boundary. All packets above the NAT layer 145 are in "DIP Space", and all packets below the NAT layer 145 are in "VIP Space". Other network controllers 116 can create other suitable layers 145 above or below this NAT layer 145, and can create rules 148 to match VIPs or DIPs, respectively, without coordination with or involvement of the NAT network controller 116. One example operating sequence is described in more detail below with reference to FIGS. 6A-6B.

Figure 4:
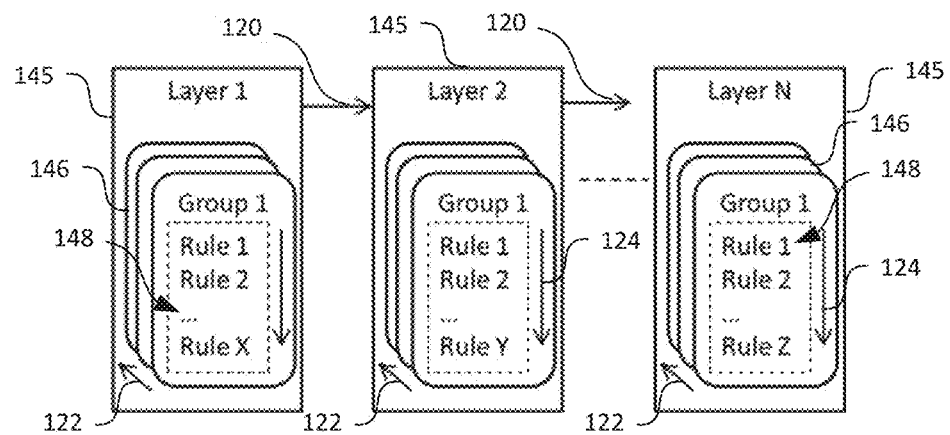
FIG. 4 is a schematic diagram illustrating organization and data flow in a virtual switch implemented at a host in a distributed computing system in accordance with embodiments of the disclosed technology.

FIG. 4 is a schematic diagram illustrating organization and data flow in a virtual switch 141 implemented at a host 106 in a distributed computing system 100 in accordance with embodiments of the disclosed technology. As shown in FIG. 4, layers 145 can be arranged in sequence as "Layer 1," "Layer 2," . . . "Layer N." Each layer 145 can include multiple groups 146, each of which in turn can include multiple rules 148, illustrated as "Rule 1," "Rule 2," . . . , and "Rule X." Also shown in FIG. 4, during matching, each of the layers 145 can be evaluated in sequence, as indicated by the arrows 120. Thus, "Layer 1" can be evaluated before "Layer 2," and so on.

Within each layer 145, rules 148 can be organized into logical groups 146 for management purposes. Groups 146 can be units of policy that can be transactionally updated. When classifying packets 114, the virtual switch 141 can iterate through groups 146 in a layer 145 to find the highest priority rule 148 in each group 146 that matches the packet 144, as indicated by the arrows 122. In one embodiment, the virtual switch 141 can select a rule 148 matched by the last group 146 in a layer 145. In other embodiments, a rule 148 can be marked as "terminating," meaning that if the rule 148 ever matches, action of the rule 148 can be immediately applied without traversing further groups 146. Groups 146 can have conditions just like rules 148. If a condition of a group 146 does not match, the virtual switch 141 can skip the group 146. Below are two examples of how groups 146 can be used for management of different policies in one layer 145:

Groups 146 can be created and managed on a per-container basis by setting an IP condition for virtual machines 144 with Docker-style containers; and
For a stateful firewall, infrastructure ACLs and customer ACLs can be expressed as two groups 146 in a layer 145. Block rules in the two groups 146 can be marked terminating. Thus, if either group 146 blocks access, a packet is dropped. Only when both groups 146 of rules 148 allow a packet does the packet go through.

In addition to priority-based matching, individual groups 146 can be Longest Prefix Matching on a condition type (for example, destination IP address) to support routing scenarios, which can be implemented as a compressed trie.

As shown in FIG. 4, within each group 146, the rules 148 can be evaluated in sequence as indicated by the arrows 124. Thus, in the example shown in FIG. 4, "Rule 1" of "Group 1" in "Layer 1" is evaluated first before other groups 146, rules 148, and layers 145 are evaluated. As described in more detail below with reference to FIG. 5, each rule 148 can include one or more conditions and actions. Matching the conditions can cause the virtual switch 141 to perform the corresponding actions.

FIG. 5 is a schematic diagram illustrating example conditions and corresponding actions for a rule object 148 suitable for a virtual switch 141 in accordance with embodiments of the disclosed technology. In certain embodiments, a rule object 148 can be an entity that performs actions on matching packets in a MAT model. When creating a rule object or rule 148, a network controller 116 (FIG. 3) can be expressive while reducing fixed policy in a data plane.

As shown in FIG. 5, the rule 148 can include a condition list containing multiple conditions 155, and a corresponding action 156. Example conditions 155 can include source/destination MAC, source/destination IP, source/destination TCP port, source/destination User Datagram Protocol ("UDP") port, general routing encapsulation key, Virtual Extensible LAN identifier, virtual LAN ID, or other metadata from a previous layer 145 regarding the payload of the packet. Conditions 155 can have a type (such as source IP address) and a list of matching values (each value may be a singleton, range, or prefix). For a condition to match a packet, any of the matching values can match as in an OR clause. For a rule 148 to match, all conditions 155 in the rule 148 match as in an AND clause.

The action 156 can also contain a type and a data structure specific to that type with data needed to perform the action. For example, an encapsulation rule 148 can takes as input data a source/destination IP address, source/destination MAC address, encapsulation format and key to use in encapsulating the packet. As shown in FIG. 5, the example actions can include allow/block a packet according to, for example, ACLs, network name translation (L3/L4), encapsulation/decapsulation, quality of service operations (e.g., rate limit, mark differentiated services code point, metering, etc.), encryption/decryption, stateful tunneling, and routing (e.g., equal cost multiple path routing).

The rule 148 can be implemented via a callback interface, e.g., initialize, process Packet, and de-initialize. If a rule type supports stateful instantiation, the virtual switch 141 (FIG. 3) or other suitable types of process handler can create a pair of flows in a layer 145 (FIG. 3). Flows can also be typed and have a similar callback interface to rules 148. A stateful rule 148 can include a time to live for a flow, which is a time period that a created flows can remain in a flow table after a last packet matches unless expired explicitly by a TCP state machine. In addition to the example set of actions in FIG. 5, user-defined actions can also be added, allowing the network controllers 116 to create own rule types using a language for header field manipulations.

Rules 148 alone may not be suitable for large mapping tables. For example, VNET operations typically involve a CA→PA or PA→CA lookup on outbound/inbound traffic. Several embodiments of the disclosed technology can implement an extensible model of generic resources, for example, a hash table of mappings. A "resource" generally refers to a port-wide data structure that any rule 148 on a port 143 can reference. Another example is a range list, which can implement a dynamic source NAT rule 148.

Figure 6:
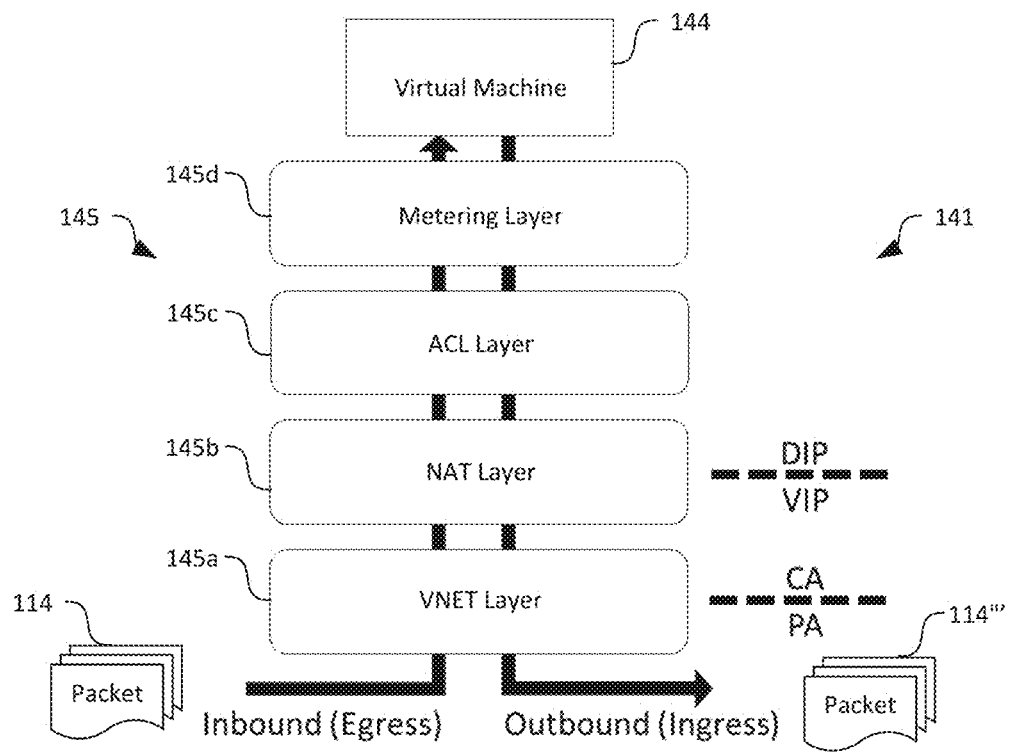
FIG. 6 is a schematic diagram illustrating an SDN deployment example in a virtual switch implemented at a host in a distributed computing system in accordance with embodiments of the disclosed technology.

FIG. 6 is a schematic diagram illustrating an SDN deployment example in a virtual switch 141 implemented at a host 106 in a distributed computing system 100 in accordance with embodiments of the disclosed technology. As shown in FIG. 6, the example SDN deployment can include four layers 145 arranged in sequence. The four layers 145 include a VNET layer 146A, a NAT layer 146B, a ACL layer 145c, and a metering layer 145d arranged in sequence. In particular, the VNET layer 146A can be programmed by a corresponding network controller 116 (FIG. 3) using tunneling for Customer Addresses ("CAs") so that packets 114 can traverse the underlay network 108 (FIG. 1) in Physical Address ("PA") space recognized by the network nodes 112 (FIG. 1) in a path between virtual machines 144. The VNET layer 146A thus creates a CA/PA boundary by having encapsulation rules 148 (FIG. 4) on the outbound path and decapsulation rules in the inbound path. The NAT layer 146B can be programmed by a different network controller 116 to implement policies for translating VIP and DIP for accommodating, for instance, a load balancer. In addition, the ACL layer 145c can be programmed to implement a stateful firewall above the NAT layer 146B. A security network controller 116, having placed the ACL layer 145c with respect to the VIP/DIP boundaries, can program policies matching DIPs of virtual machines 144 in CA space. The metering layer 145d can be implemented for tracking usage and/or billing is between the ACL layer 145c and the virtual machine 144. The metering layer 145d can implement rules 148 that can meter incoming and outgoing traffic as the user 101 (FIG. 1) of the virtual machine 144 experiences.

Figure 7:
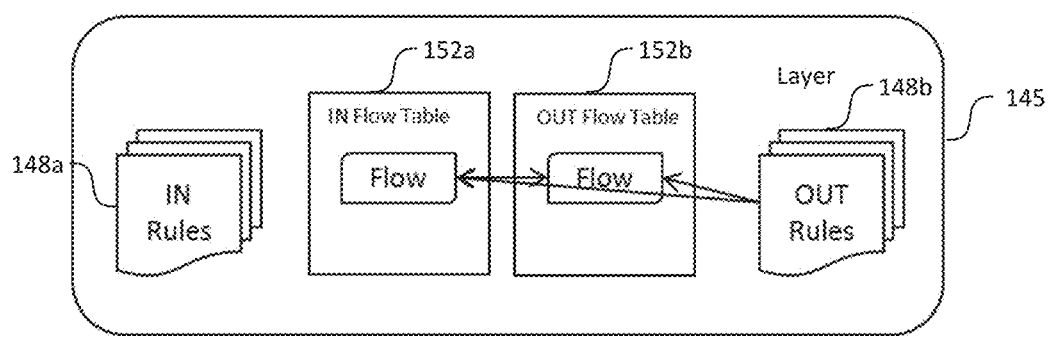
FIG. 7 is a schematic diagram illustrating example flow tables suitable for a virtual switch implemented at a host in a distributed computing system in accordance with embodiments of the disclosed technology.

Layering can be a model on which to implement stateful policies. Packets on a given connection can be in the same IP/Port state on both the inbound and outbound path, flow state may be maintained on a layer 145 by assuming that a TCP or UDP 5-tuple (Source-IP, Destination-IP, IP Protocol, Source Port, Destination Port) is the opposite on each side of the layer 145, and encoding that in a hash table of all connections in either direction. As shown in FIG. 7, when a stateful rule is matched, the layer 145 can create both an inbound and outbound flow in corresponding layer flow tables 152a and 152b. The flow or packet traffic in the direction of the rule 148 having the action of the rule 148, and the opposite direction taking the opposite action to maintain layering. Such inbound and outbound flows are considered paired because their actions simply change the packet 114 (FIG. 6) to the state of the opposite flow in the pair rather than carrying own action context.

Processing a packet according to layers 145 as shown in FIGS. 6 and 7 can involve traversing each layer 145 in sequence by parsing the packet 114, modifying the packet 114 according to a selected rule 148, and forwarding the modified packet 114 to the next layer 145 for a repeat of similar operations. Such repeated parsing and modification can reduce packet processing performance as packets 114 traverse each layer 145 in turn. Thus, as a number of layers 145, groups 146, or rules 148 increase, packet processing at the virtual switch 141 can become a bottleneck for virtual machine performance, especially when individual hosts 106 (FIG. 1) continue to host increasing numbers of virtual machines 144. Several embodiments of the disclosed technology can provide high packet processing rates via flow action caching even for large numbers of layers 145, groups 146, or rules 148, as described in more detail below with reference to FIGS. 8A-8C.

Figure 8A:
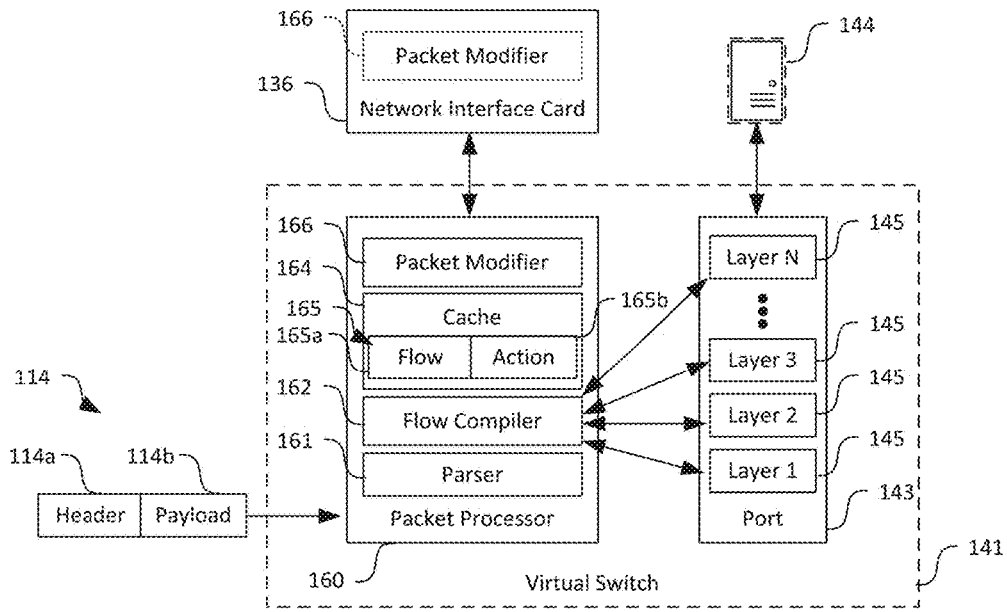
FIGS. 8A-8C are schematic diagrams illustrating incoming and outgoing data processing in a virtual switch implemented at a host in a distributed computing system in accordance with embodiments of the disclosed technology.
Figure 8B:
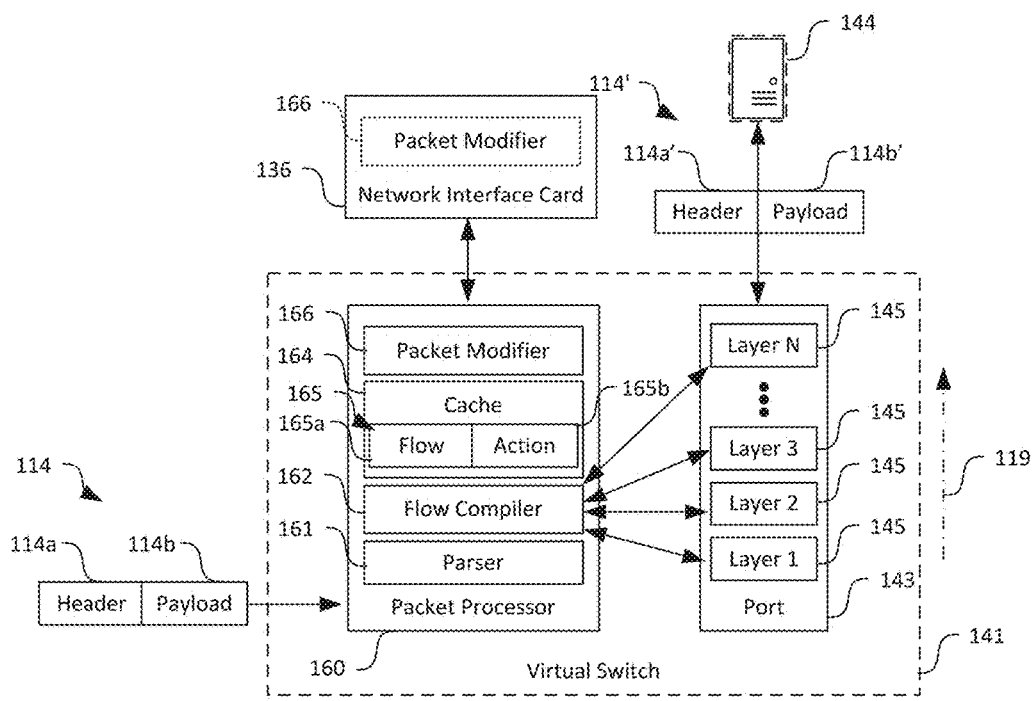
Figure 8C:
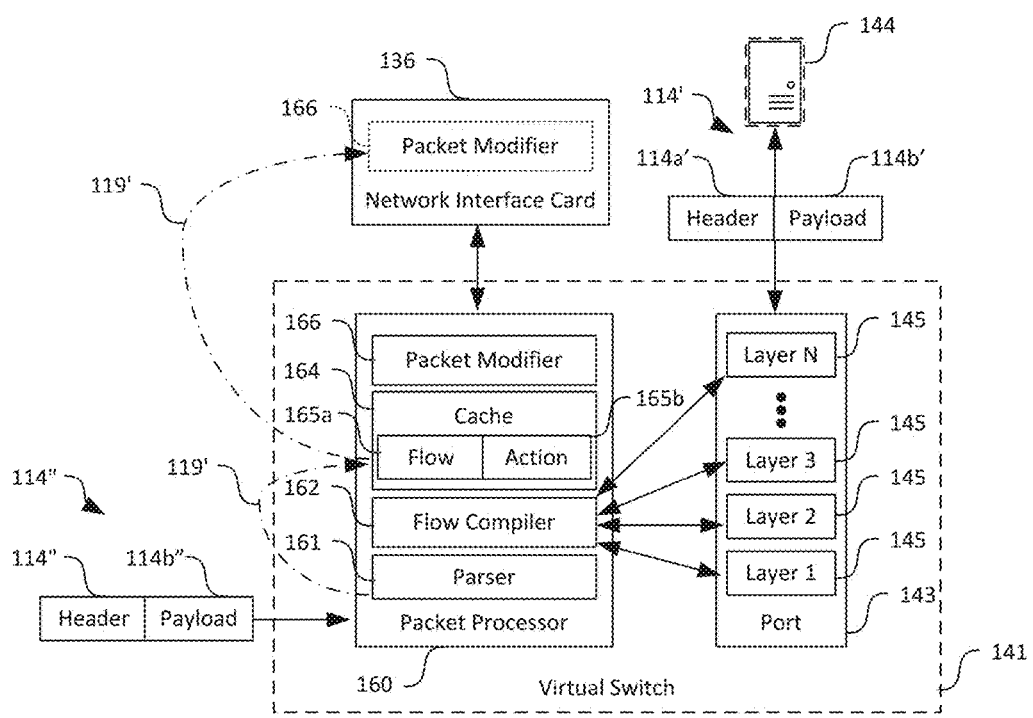

FIGS. 8A-8C are schematic diagrams illustrating incoming and outgoing data processing in a virtual switch 141 implemented at a host 106 in a distributed computing system 100 in accordance with embodiments of the disclosed technology. As shown in FIG. 8A, the virtual switch 141 can include a packet processor 160 configured to process a packet 114 having a header 114a and a payload 114b. The header 114a can include various header fields configured to contain corresponding values. An example of a header 114a is described in more detail below with reference to FIGS. 9A and 9B.

As shown in FIG. 8A, the packet processor 160 can include a parser 161, a flow compiler 162, a cache 164 containing a unified flow table 165 having a flow column 165a and an action column 165b. In the illustrated embodiment, the packet processor 160 can also include a packet modifier 166 for applying one or more actions on the payload 114b of the packet 114. In other embodiments, the packet modifier 166 can be provided by the network interface card 136 by, for example, programming a field programmable gate array ("FPGA") or other configurable hardware circuits (shown in phantom lines for clarity).

The parser 161 can be configured to parse some or all of the header fields in the header 114a. For example, the parser 161 can parse header fields that contain values for matching in conditions described above with reference to FIG. 5. In certain embodiments, one of an L2/L3/L4 header (e.g., as those shown in Table 1 below) can form a header group, and the header fields of a header group can form a single flow identification ("FlowID"). The tuple of a FlowID in a packet 114 can be a Unified FlowID ("UFID") as output of the parser 161. In other embodiments, a hash value of the FlowID or other suitable numbers may be used as the FlowID or UFID.

TABLE 1

Example header fields of a packet header 114a

| Header | Parameters |
|---|---|
| Ethernet (L2) | Source MAC, Dest MAC |
| IP (L3) | Source IP, Dest IP, ToS (DSCP + ECN) |
| Encapsulation (L4) | Encapsulation Type, Tenant ID, Entropy (Optional) |
| TCP/UDP (L4) | Source Port, Dest Port, TCP Flags (note: does not support Push/Pop) |

The parser 161 can then forward the parsed header fields 114a as, for instance, an UFID to the flow compiler 162 and/or the packet modifier 166 for performing header transposition, packet modification, or other suitable types of further processing.

The flow compiler 162 can be configured to perform header transpositions parameterized with one or more header fields in a header. A valid flow can thus be transformed into any other valid flow via a header transposition. As used herein, a "header transposition" generally refers to changing, shifting, or otherwise manipulating one or more header fields of a packet 114. A header transposition can include a list of one or more parameterizable header actions with one action corresponding to a header. As shown in Table 2 below, example header actions can include Push a header (i.e., add a header to a header stack), Modify a header (i.e., change header fields within a header), Pop a header (i.e., remove a header from a header stack), or Ignore a header (i.e., pass over a header). In other examples, header actions can also include encryption, decryption, or other suitable actions performed on values in one or more header fields.

TABLE 2

Example header actions

| Action | Notes |
|---|---|
| Pop | Remove this header. |
| Push | Push this header onto the packet. All header parameters for creating the new header are specified. |
| Modify | Modify this header. All header parameters needed are optional, but at least one is specified. |
| Ignore | Leave this header as is. |

In certain embodiments, header actions of a header transposition can be grouped accumulatively into a composite action for a group of headers. For instance, Table 3 below shows an example header transposition involving a combination of network address translation and encapsulation/decapsulation used by VL2.

TABLE 3

Example Header Transpositions.

| Header | NAT | Encap | Decap | Encap + NAT |
|---|---|---|---|---|
| Outer Ethernet | Ignore | Push (SMAC, DMAC) | Pop | Push (SMAC, DMAC) |
| Outer IP | Modify (SIP, DIP) | Push (SIP, DIP) | Pop | Push (SIP, DIP) |
| GRE | Not Present | Push (Key) | Pop | Push (Key) |
| Inner Ethernet | Not Present | Modify (DMAC) | Ignore | Modify (DMAC) |
| Inner IP | Not Present | Ignore | Ignore | Modify (SIP, DIP) |
| TCP/UDP | Modify (SPt, DPt) | Ignore | Ignore | Modify (SPt, DPt) |

As shown in Table 3 above, for network address translation, the outer Ethernet header is ignored. However, for encapsulation of VL2, the header action includes a Push action to add a header with a source MAC (i.e., SMAC) and a destination MAC (i.e., DMAC). Thus, as a result of a combination of network address translation and encapsulation, the result header transposition is a composite action that include a Push action to add a header of SMAC and DMAC.

Thus, the flow compiler 162 can be configured to generate a composite action for a particular UFID by composing header transpositions from matched rules 148 (FIG. 3) in each layer 145 (FIG. 4). In certain embodiments, the flow compiler 162 can be implemented as represented by the Pseudocode below in which the output "composite" represents the composite action:

```
Process (UFID input, Port port);
   Transposition action = {0};
   For each layer in port.layers:
      UFID localId = Transpose (input, action);
      Rule rule = Classify (layer, localId);
      action = action.compose (rule.process(localId));
   return composite;
```

For instance, a packet passing an example network name translation layer and the VL2 VNET encapsulation layer can have a composite action as shown in the "Encap+NAT" column in Table 3 above. In other embodiments, the flow compiler 162 can also be implemented to generate a composite action based on other suitable heuristics. In further embodiments, the flow compiler 162 can also be configured to apply a composite action to a packet by logically dividing the composite action into a series of operations, e.g., network name translation, encapsulation, decapsulation that can be applied by the packet modifier 166.

Without being bound by theory, it is believed that a flow action corresponding to a UFID can be relatively stable over a lifetime of the flow. As such, the UFID with the resulting composite action from the flow compiler 162 can be cached and reused, for instance, per TCP/UDP flow. As shown in FIG. 8A, the UFID and the composite action can be stored in the cache 164 as entries of the unified flow table 165. In the illustrated embodiment, the unified flow table 165 can include a flow column (i.e., "Flow") 165a and an action column (i.e., "Action") 165b. Thus, an entry in the unified flow table 165 can contain a UFID in the flow column 165a with a corresponding composite action in the action column 165b. In other embodiments, the unified flow table 165 can also include a generation identifier column, a created date/time column, or other suitable columns. Based on entries in the unified flow table 165, data paths through the virtual switch 141 can be separated into a fast path and a slow path, as described in more detail below with reference to FIGS. 8B-8C.

Certain flow actions can have packet operations beyond header modifications. Examples of such flow actions can include metering to a global counter, or encrypting the payload 114b or the packet 114. For these actions, in certain embodiments, the flow compiler 162 can be configured to provide action contexts which can implement suitable logic via callback. A rule 148 (FIG. 4) can add an action context to an header transposition operation and the resulting composite action. Rules 148 can thus be used to extend flow actions even though the rules 148 are not matched for every packet 114.

A feature of the flow compiler 162 is transparency to clients of the flow compiler 162. As such, when a network controller 116 (FIG. 3) changes a rule 148 in a layer 145, the new rule 148 can be applied to subsequent packets 114 even if an entry in the unified flow table 165 already exists for a UFID. In certain embodiments, the packet processor 160 can be configured to maintain a global generation number on each port 149 (FIG. 2). When an entry for a flow is created in the unified flow table 165, the created entry is tagged with a current generation number. Upon rule update, the port generation number can be incremented. Thus, when matching a flow whose generation number is less than a current generation number of a port, the flow compiler 162 can recompile the flow based on the updated rule 148 to determine if the resulting composite action has changed. In response to determining that the composite action has changed, the flow compiler 162 can update the entry in the unified flow table 165 with the updated composite action; otherwise, the flow compiler 162 can maintain the current composite action in the unified flow table 165.

In certain embodiments, entries in the unified flow table 165 can expire after certain configurable period of time (e.g., 30 minutes). However, such time periods may be inefficient for short flows and may lead to large numbers of entries idling in the unified flow table 165. Thus, in certain embodiments, the flow compiler 162 can be configured to expire entries for certain flows by tracking a state of corresponding underlying connections, which involves determining which entry is paired with another in the opposite direction to form a bidirectional connection.

Entries in the unified flow table 165 can be asymmetric. For example, if a connection is tunneled to the virtual machine 144 on inbound but returned directly without tunneling on outbound. Several embodiments of the disclosed technology are directed to pairing connections on the side of the virtual machine 144. When an inbound entry is created in the unified flow table 165 by an inbound packet 114, an outbound entry can be created to pair with the inbound entry by reversing the UFID of the packet 114 after the inbound action, and simulating the flow through the outbound path of that port. For a new outbound entry, the packet processor 160 may wait for an inbound packet 114 to try to create an inbound entry. Thus, when the flow compiler 162 looks up the reverse UFID of the inbound new entry, the packet processor 160 can find an existing flow to pair with the new inbound entry.

Once a pairing of entries in the unified flow table 165 is established, a TCP state machine (not shown) can be implemented in the packet processor 160 to track the paired entries as connections. For example, new flows can be created in a probationary half-open state. Only when a three-way handshake is verified with proper sequence numbers, the new flows can become a full flow. The state machine can also track finish handshakes and TCP/IP reset flags to expire flows early. The state machine can also track connections in TIME_WAIT, allowing network name translation rules to determine when ports can be reused safely.

As shown in FIG. 8A, in operation, the parser 161 can parse the header 114a of the packet 114 upon receiving the packet 114 at the virtual switch 141. The parser 161 can then forward the parsed header 114a to the packet modifier 166 to determine whether an existing entry in the unified flow table 165 already exists for a flow to which the packet 114 belongs. In response to determining that the unified flow table 165 does not include an entry for the flow, the packet modifier 166 can forward the parsed header 114a to the flow compiler 162 for further processing. In response to determining that the unified flow table 165 does include an entry for the flow, the packet modifier 166 can perform the corresponding composite action, as described in more detail below with reference to FIG. 8C.

FIG. 8B shows a slow path processing of the packet 114 in accordance with embodiments of the disclosed technology. As shown in FIG. 8B, the flow compiler 162 can compile a composite action by iterating or traversing through rules 148 in all the layers 145 in sequence, as indicated by the arrow 119 and described above with reference to FIGS. 3-5. Upon completion of the compiling, the flow compiler 162 can provide the generated composite action to the packet modifier 166. In turn, the packet modifier 166 can apply the composite action to the packet 114 to generate a modified packet 114'. The modified packet 114' can then be provided to the virtual machine 144. The flow compiler 162 can also create one or more entries in the unified flow table 165 in the cache 164 for storing the UFID and the corresponding composite action. Based on the entry in the unified flow table 165, the packet modifier 166 can process subsequent packets 114" of the same flow following the fast path, as described below with reference to FIG. 8C.

As shown in FIG. 8C, in response to determining that an entry already exists in the unified flow table 165 for a flow to which the packet 114" belongs, the packet modifier 166 can retrieve the composite action corresponding to the flow from the unified flow table 165 and perform the composite action directly, without recompiling the composite action using the flow compiler 162. As such, processing of the additional packet 114" can be faster than processing the packet 114 of FIG. 8A. In certain embodiments, the packet modifier 166 of the packet processor 160 residing in the virtual switch 141 can perform the packet modification. In other embodiments, the packet modifier 166 (or at least a component thereof) provided by the network interface card 136 can perform the packet modification by accessing the unified flow table 165 in the cache 164. In further embodiments, components of the packet modifier 166 may be located at both the virtual switch 141 and the network interface card 136 and cooperate to perform the packet modification.

Figure 9A:
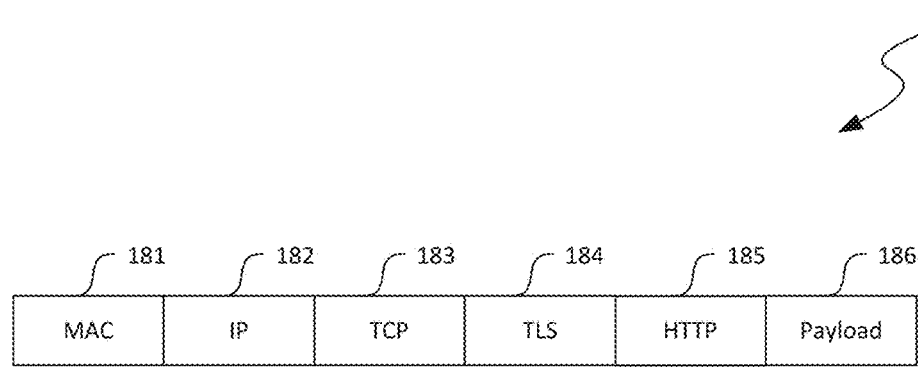
FIGS. 9A-9B illustrate an example data schema for a packet header in accordance with embodiments of the disclosed technology.

FIG. 9A is a schematic diagram illustrating a data schema 180 suitable for a packet header in accordance with embodiments of the disclosed technology. As shown in FIG. 9A, the data schema 180 can include a MAC field 181, an IP field 182, a TCP field 183, a TLS field 184, an HTTP field 185, and a data field 186. The MAC field 181, the IP field 182, and the TCP field 183 can be configured to contain a MAC address, an IP address, and a port number of the hardware accelerator 138 (FIG. 2) and/or the host 106 (FIG. 2), respectively. The TLS field 184 can be configured to contain a value indicating a type of data contained in the packet. Example values for the TLS field 184 can include APPLICATION_DATA, CHANGE_CIPHER_SPEC, ALERT, or HANDSHAKE. The HTTP field 185 can be configured to contain various parameters according to the HTTP protocol. For example, the parameters can include a content length of the data in the data field 186, cache control, etc. Example header fields of the HTTP field 185 are described in more detail with reference to FIG. 9B. Even though the example data schema 180 includes the HTTP field 185, in other embodiments, the data schema 180 can include Secure Shell, Secure Copy, Secure FTP, or other suitable header fields.

Figure 9B:
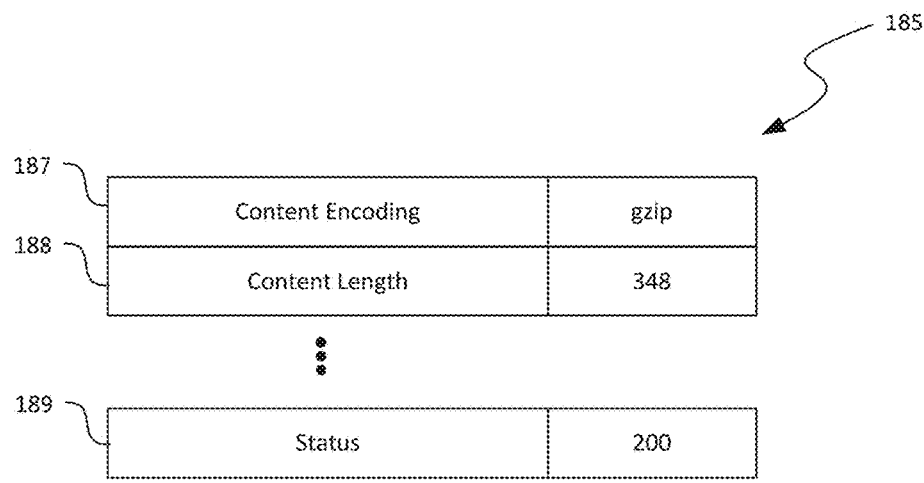

FIG. 9B is a schematic diagram illustrating example header fields suitable for the HTTP field 185 in FIG. 9A in accordance with embodiments of the disclosed technology. As shown in FIG. 9B, the header fields can include a content encoding field 187 configured to contain an encoding identification, a content length field 188 configured to store a content or payload length in, for instance, bytes, and a status field 189 configured to contain a numerical value indicating whether the content or payload associated with the HTTP header is valid. In the illustrated example, the content encoding field 187 contains "gzip" as an encoding identifier; the content length field 188 contains "348" indicating that the content or payload is 348 bytes long; and the status field 189 contains a numerical value of "200" indicating that the content or payload is valid. Though particular fields are shown in FIG. 5B as examples, in other embodiments, the HTTP header 185 can also include fields configured to contain content language, content location, content range, and/or other suitable parameters.

Figure 10A:
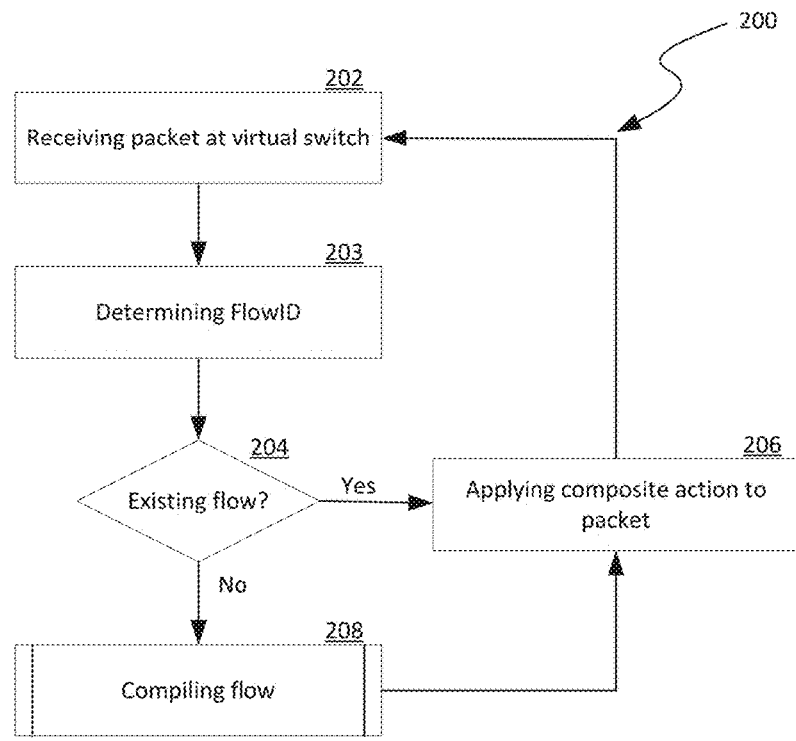
FIGS. 10A-10B are flowcharts illustrating processes for processing incoming/outgoing packets in a virtual switch in accordance with embodiments of the disclosed technology.
Figure 10B:
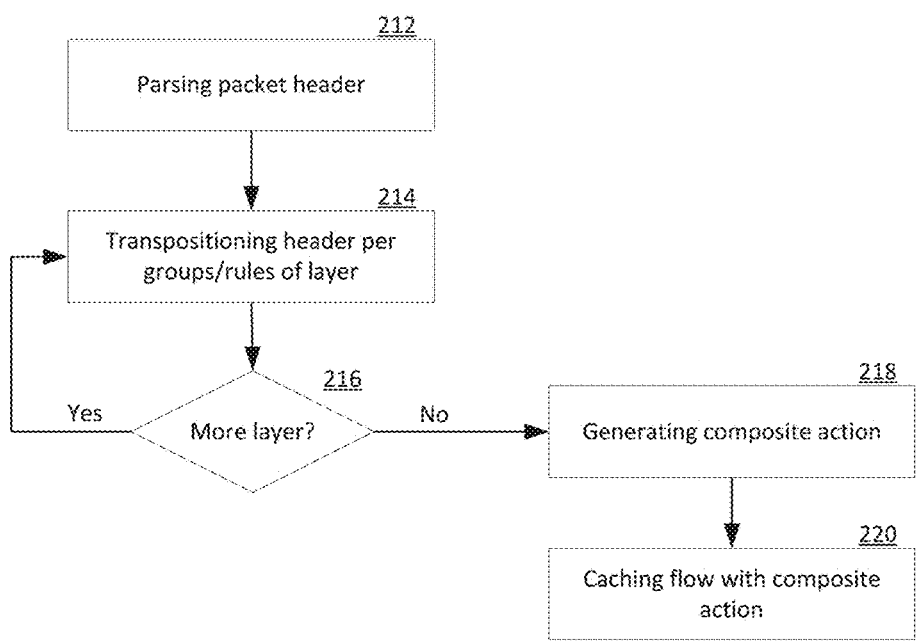

FIGS. 10A-10B are flowcharts illustrating processes for processing incoming/outgoing packets in a virtual switch in accordance with embodiments of the disclosed technology. Even though aspects of the processes are described below with reference to the distributed computing system 100 of FIGS. 1 and 2, in other embodiments, aspects of the processes can also be implemented in other suitable computing systems with additional and/or different components.

As shown in FIG. 10A, a process 200 can include receiving a packet at a virtual switch at stage 202. The packet can include a header having one or more header fields and a payload. The process 200 can then include determining a FlowID of a flow to which the received the packet belongs at stage 203. In certain embodiments, one of an L2/L3/L4 header (e.g., as those shown in Table 1 above) can form a header group, and the header fields of a header group can form a FlowID. The tuple of a FlowID in a packet 114 can be a UFID. In other embodiments, a hash value of the FlowID or other suitable numbers may be used as the FlowID or UFID. The process 200 can then include a decision stage 204 to determine whether the determined FlowID corresponds to an existing flow with a corresponding entry in a unified flow table. In response to determining that the FlowID does correspond to an existing flow with an entry in the unified flow table, the process 200 can include applying a corresponding composite action identified by the entry in the unified flow table at stage 206. In certain embodiments, applying the composite action can include performing header modification on one or more header fields of the packet. In other embodiments, applying the composite action can also include encrypting, decrypting, or performing other suitable actions on values of one of more header fields and/or the payload of the packet.

In response to determining that FlowID does not correspond to an existing flow with an entry in the unified flow table, the process 200 can include compiling a flow at stage 208. In certain embodiments, compiling the flow can include traversing layers, groups, and rules developed by various network controllers to determine a composite action related to the flow. In other embodiments, compiling the flow can also include performing certain operations via action context to the packet. Example operations of compiling the flow are described in more detail below with reference to FIG. 10B.

As shown in FIG. 10B, the operations of compiling a flow can include parsing a packet header at stage 212. In certain embodiments, parsing the packet header can include parsing one or more header fields that contain values for matching in conditions to a rule as described above with reference to FIG. 5. Example header fields can include source/destination MAC, source/destination IP, source/destination TCP port, source/destination UDP port, general routing encapsulation key, Virtual Extensible LAN identifier, virtual LAN ID, or other suitable header fields containing metadata regarding the payload of the packet.

The operations can also include performing header transposition for the packet per rules in groups of an initial layer to determine a flow action at stage 214. Example header transposition operations are described above with reference to FIG. 8A. Example flow actions can include allow/block a packet according to, for example, ACLs, network name translation (L3/L4), encapsulation/decapsulation, quality of service operations (e.g., rate limit, mark differentiated services code point, metering, etc.), encryption/decryption, stateful tunneling, and routing (e.g., equal cost multiple path routing).

The operations can then include a decision stage 216 to determine whether other layers are present in addition to the initial layer. In response to determining that other layers are present in addition to the initial layer, the operations revert to performing header transposition per rules in groups of another layer to generate a composite action that is accumulative to the flow action determined based on the initial layer. In response to determining that no other layers are present in addition to a current layer, the operations proceed to generating a composite action as accumulative of the flow actions from traversing all the layers at stage 218. The operations can then include caching the composite action of the flow as an entry in a unified flow table at stage 220. In certain embodiments, the entry can include a FlowID corresponding to the composite action. In other embodiments, the entry can also include a generation number or other suitable parameters.

FIG. 11 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 11, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method for facilitation communication in a distributed computing system having hosts individually supporting a virtual switch and one or more virtual machines, comprising:
   receiving, at the virtual switch provided by a host, a packet having a header with multiple header fields and a payload; and
   processing, at the virtual switch, the received packet based on multiple layer, group, and rule objects arranged in a hierarchy in which the multiple layer objects individually contain one or more group objects that individually contain one or more rule objects, each of the rule objects containing one or more conditions and a corresponding action performable by the virtual switch on the packet, wherein processing the received packet includes,
  parsing one or more of the header fields of the packet;
  matching the parsed one or more header fields with the conditions of one of the rule objects from the group objects of each of the layer objects;
  generating a composite action having multiple actions each corresponding to a matched rule object from each of the layer objects without applying any of the multiple actions to the packet, the multiple actions being accumulative to one another; and
  subsequently, applying the generated composite action to the packet.

2. The method of claim 1 wherein matching the parsed one or more header fields includes:
  determining whether a value in one or more of the header fields of the packet matches the one or more conditions of one of the rule objects in the group objects of the layer object;
  in response to determining that the value in one or more of the header fields of the packet matches the one or more conditions of one of the rule objects in the group objects of the layer object, adding the one or more actions corresponding to the matched rule object to the composite action; and
  repeating the determining and adding operations based on additional layer objects until no more layer objects are present.

3. The method of claim 1, further comprising subsequent to generating the composite action, caching the composite action with a flow identifier as a flow in a flow table, the flow identifier corresponding to a combination of an internet protocol ("IP") address and a transport control protocol ("TCP") port number contained in the one or more parsed header fields of the packet.

4. The method of claim 1 wherein the packet is a first packet, and wherein the method further includes:
  subsequent to generating the composite action, caching the composite action with a flow identifier as a flow in a flow table, the flow identifier corresponding to a combination of an internet protocol ("IP") address and a transport control protocol ("TCP") port number contained in the one or more parsed header fields of the packet;
  in response to receiving a second packet at the virtual switch,
    parsing one or more of the header fields of the second packet;
    determining whether the second packet belongs to the same flow as the first packet; and
    in response to determining that the second packet belongs to the same flow as the first packet, applying the composite action generated based on the first packet to the second packet without performing the matching and generating operations based on the second packet.

5. The method of claim 1, further comprising:
  subsequent to generating the composite action, caching the composite action with a flow identifier and a generation number as a flow in a flow table, the flow identifier corresponding to a combination of an IP address and a TCP port number contained in the one or more parsed header fields of the packet, wherein the generation number corresponding to a version of the rules in the layers related to a TCP port identified by the TCP port number;
  in response to receiving a second packet,
    parsing one or more of the header fields of the second packet;
    determining whether the second packet belongs to the same flow as the first packet; and
    in response to determining that the second packet belongs to the same flow as the first packet,
      determining whether a generation number of the TCP port is different than the generation number of the entry in the flow table;
      in response to determining that the generation number of the TCP port is the same as the generation number of the entry in the flow table, applying the composite action generated based on the first packet to the second packet without performing the matching and generating operations based on the second packet; and
      in response to determining that the generation number of the TCP port is different than the generation number of the entry in the flow table, repeating the matching and generating operations based on the parsed one or more header fields of the second packet.

6. The method of claim 1 wherein the packet is a first packet and the host includes a memory and a programmable network interface card, and wherein the method further includes:
  subsequent to generating the composite action, caching the composite action with a flow identifier as a flow in a flow table in the memory of the host, the flow identifier corresponding to a combination of an internet protocol ("IP") address and a transport control protocol ("TCP") port number contained in the one or more parsed header fields of the packet;
  in response to receiving a second packet at a programmable network interface card, utilizing a hardware circuit in the programmable network interface card,
    parsing one or more of the header fields of the second packet;
    accessing the cached composite action with the flow identifier to determine whether the second packet belongs to the same flow as the first packet; and
    in response to determining that the second packet belongs to the same flow as the first packet,
      retrieving the corresponding composite action from the flow table; and
      applying the retrieved composite action generated based on the first packet to the second packet without performing the matching and generating operations based on the second packet.

7. The method of claim 1 wherein the packet is a first packet, and wherein the method further includes:
  subsequent to generating the composite action, caching the composite action with a flow identifier as a flow in a flow table, the flow identifier corresponding to a combination of an internet protocol ("IP") address and a transport control protocol ("TCP") port number contained in the one or more parsed header fields of the packet;
  in response to receiving a second packet at the virtual switch,
    parsing one or more of the header fields of the second packet;

determining whether the second packet belongs to the same flow as the first packet; and in response to determining that the second packet does not belong to the same flow as the first packet, performing the matching and generating operations based on the parsed one or more of the header fields of the second packet.

8. The method of claim 1 wherein the packet is a first packet, and wherein the method further includes:

subsequent to generating the composite action, caching the composite action with a flow identifier as a flow in a flow table, the flow identifier corresponding to a combination of an internet protocol ("IP") address and a transport control protocol ("TCP") port number contained in the one or more parsed header fields of the packet;

in response to receiving a second packet at the virtual switch, parsing one or more of the header fields of the second packet;

determining whether the second packet belongs to the same flow as the first packet; and in response to determining that the second packet does not belong to the same flow as the first packet, performing the matching and generating operations based on the parsed one or more of the header fields of the second packet to generate another composite action and caching the generated another composite action with another flow identifier as another flow in the flow table.

9. The method of claim 1 wherein applying the generated composite action to the packet includes dividing the composite action into a series of packet operations related to one of network name translation, encapsulation/decapsulation, encryption/decryption, quality of service, stateful tunneling, or routing.

10. A computing device in a distributed computing system having multiple computing devices connected to one another via a computer network, comprising:

a processor; and a memory containing instructions executable by the processor to cause the computing device to provide a virtual switch and one or more virtual machines, the memory also containing additional instructions executable by the processor to cause the computing device to:

receive, via the computer network, a packet having a header with multiple header fields and a payload;

parse one or more of the multiple header fields of the received packet;

process, at a virtual switch, the received packet based on multiple layer, group, and rule objects arranged in a hierarchy in which the multiple layer objects individually contain one or more group objects that individually contain one or more rule objects, each of the rule objects containing one or more conditions and a corresponding action performable by the virtual switch on the packet to generate a composite action having multiple flow actions each corresponding to a matched rule object from one of multiple layer objects based on the parsed one or more of the multiple header fields of the packet without applying any of the multiple actions to the packet, the multiple flow actions being accumulative to one another; and subsequently, apply the generated composite action to the packet.

11. The computing device of claim 10 wherein:

the rule object includes one or more conditions and a corresponding flow action; and to generate the composite action includes, for each of the layer objects, determine whether the parsed one or more of the multiple header fields of the packet match the one or more conditions of the rule object; and in response to determining that the parsed one or more of the multiple header fields of the packet match the one or more conditions of the rule object, adding the corresponding flow action of the rule object to the composite action.

12. The computing device of claim 10 wherein the memory contains yet additional instructions executable by the processor to cause the computing device to cache the composite action with a flow identifier as a flow in a flow table, the flow identifier corresponding to a combination of an internet protocol ("IP") address and a transport control protocol ("TCP") port number contained in the one or more parsed header fields of the packet.

13. The computing device of claim 10 wherein the packet is a first packet, and wherein the memory contains yet additional instructions executable by the processor to cause the computing device to:

cache the composite action with a flow identifier as a flow in a flow table, the flow identifier corresponding to a combination of an internet protocol ("IP") address and a transport control protocol ("TCP") port number contained in the one or more parsed header fields of the first packet; and in response to receiving a second packet, determine whether the second packet belongs to the same flow as the first packet based on a combination of an IP address and a TCP port number of the second packet; and in response to determining that the second packet belongs to the same flow as the first packet, apply the composite action generated based on the first packet to the second packet.

14. The computing device of claim 10 wherein the packet is a first packet, and wherein the memory contains yet additional instructions executable by the processor to cause the computing device to:

cache the composite action with a flow identifier as a flow in a flow table, the flow identifier corresponding to a combination of an internet protocol ("IP") address and a transport control protocol ("TCP") port number contained in the one or more parsed header fields of the first packet; and in response to receiving a second packet, determine whether the second packet belongs to the same flow as the first packet based on a combination of an IP address and a TCP port number of the second packet; and in response to determining that the second packet does not belong to the same flow as the first packet, generate another composite action based on the rule objects in the multiple layers.

15. The computing device of claim 10 wherein the packet is a first packet, and wherein the memory contains yet additional instructions executable by the processor to cause the computing device to:

cache the composite action with a flow identifier as a flow in a flow table, the flow identifier corresponding to a combination of an internet protocol ("IP") address and a transport control protocol ("TCP") port number contained in the one or more parsed header fields of the first packet; and in response to receiving a second packet, determine whether the second packet belongs to the same flow as the first packet based on a combination of an IP address and a TCP port number of the second packet; and in response to determining that the second packet does not belong to the same flow as the first packet, generate another composite action based on the rule objects in the multiple layers and cache the another composite action with another flow identifier as another flow in the flow table.

16. A method for facilitation communication in a distributed computing system having hosts individually supporting a virtual switch and one or more virtual machines, comprising:

receiving, via a computer network, a packet having a header with multiple header fields and a payload;

parsing one or more of the multiple header fields of the received packet; and processing, at a virtual switch, the received packet based on multiple layer, group, and rule objects arranged in a hierarchy in which the multiple layer objects individually contain one or more group objects that individually contain one or more rule objects, each of the rule objects containing one or more conditions and a corresponding flow action performable by the virtual switch on the received packet, wherein the processing includes:

matching the received packet with a rule object from each of the multiple layer objects based on the parsed one or more of the multiple header fields;

generating a composite action by combining the flow actions individually corresponding to one of the matched rule objects from one of the multiple layer objects without applying any of the multiple actions to the packet, the multiple actions being accumulative to one another; and subsequently, applying the generated composite action to the packet.

17. The method of claim 16 wherein matching the received packet includes:

determining whether a value in one or more of the header fields of the packet matches the one or more conditions of the rule object;

in response to determining that the value in one or more of the header fields of the packet matches the one or more conditions of the rule object, adding the one or more actions corresponding to the matched rule object to the composite action; and repeating the determining and adding operations based on additional layer objects until no more layer objects are present.

18. The method of claim 16 wherein the packet is a first packet, and wherein the method further includes:

subsequent to generating the composite action, caching the generated composite action with a flow identifier as a flow in a flow table, the flow identifier corresponding to a combination of an internet protocol ("IP") address and a transport control protocol ("TCP") port number contained in the one or more parsed header fields of the packet;

in response to receiving a second packet, determining whether the second packet belongs to the same flow as the first packet based on an IP address and a TCP port number of the second packet; and in response to determining that the second packet belongs to the same flow as the first packet, applying the composite action generated based on the first packet to the second packet without performing the matching and generating operations based on the second packet.

19. The method of claim 16 wherein the packet is a first packet, and wherein the method further includes:

subsequent to generating the composite action, caching the generated composite action with a flow identifier as a flow in a flow table, the flow identifier corresponding to a combination of an internet protocol ("IP") address and a transport control protocol ("TCP") port number contained in the one or more parsed header fields of the packet;

in response to receiving a second packet, determining whether the second packet belongs to the same flow as the first packet based on an IP address and a TCP port number of the second packet; and in response to determining that the second packet does not belong to the same flow as the first packet, performing the matching and generating operations based on the second packet to generate another composite action and applying the composite action to the second packet.

20. The method of claim 16 wherein the flow actions can individually include one of adding a header, modifying a header, removing a header, or ignoring a header from the one or more header fields of the packet.

* * * * *